Sept. 7, 1948.  J. M. WISNIEWSKI  2,448,646
BEARING SEAL
Filed May 7, 1946
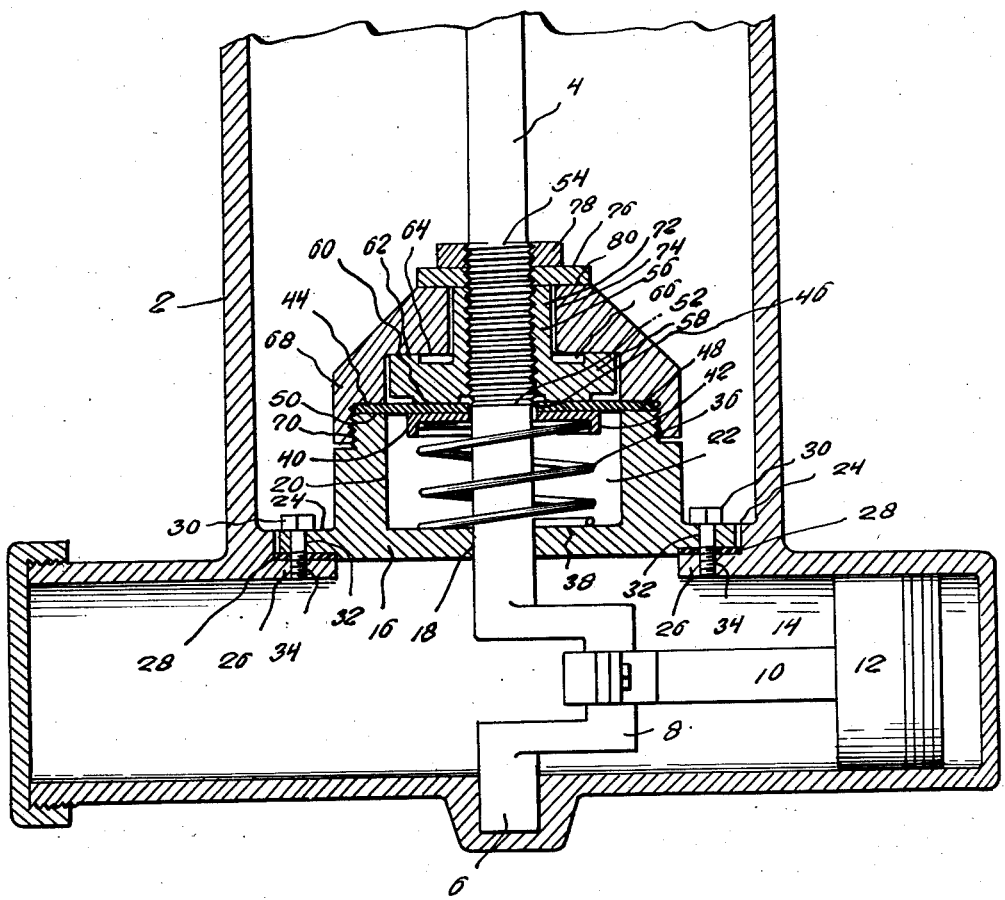
Inventor
John M. Wisniewski, Patented Sept. 7, 1948

2,448,646

UNITED STATES PATENT OFFICE 2,448,646

BEARING SEAL

John M. Wisniewski, Prattsburg, N. Y.

Application May 7, 1946, Serial No. 667,911

2 Claims. (Cl. 286—11)

This invention relates to bearing seals for rotating shafts.

An object of the invention is to provide a self-sealing flange packing for all types of rotating shafts.

Another object of the invention is to provide a self-sealing bearing in which the seal is maintained automatically and in which very little resistance is offered to the turning of the shaft.

A further object of the invention is to provide a self sealing bearing construction which is simple in design, has a minimum of parts, and is inexpensive to install and maintain.

Other and further objects of the invention will become apparent from the following description of a preferred embodiment thereof as illustrated in the accompanying drawing, and in which, The figure shown illustrates in sectional elevation one form of my invention as it might be applied to a hydraulic door closing mechanism.

Referring to the drawing, it will be seen that there is a housing 2 having a rotatable shaft 4 extending therethrough, one end 6 of the shaft being journaled in the housing, and that the shaft has a crank 8 formed therein. The crank 8 engages a connecting rod 10 the other end of which is usually pivotally connected to a wrist pin extending into a piston 12, the cylinder 14 containing a hydraulic fluid.

A packing gland base 16 has an axial bore 18 through which the rotatable shaft 4 extends, the bore 18 being enlarged at 20 to form a cuplike recess 22. The gland base 16 has a peripheral flange 24 seated on a flange seat 26 forming part of the housing 2. An annular gasket 28 of any suitable gasket material is disposed in the space between the flanges 24 and 26, and scrows 30 extend through holes 32 in the flange 24 and are threaded into matching holes 34 in the flange seat 26, thus drawing the two flanges tightly together to form a seal at this point.

In the cup shaped recess 22 there is disposed a coil spring 36 having its lower end 38 resting on the floor of the recess 22 and supporting on its upper end a spring pressure plate member 40 having a skirt 42 for containing the upper end of the spring against dislodgment. An annular sealing washer 44 of suitable material such as leather and having a central aperture 46 for the passage therethrough of the shaft 4, has its rim 48 resting upon the upper rim 50 of the packing gland base 16. The shaft 4 is threaded from locations 52 to location 54, and has threaded thereon a shaft bearing member 56 having a flange 58 with a downwardly projecting annular bearing ridge 60 which is in bearing contact with the upper surface of the leather washer 44. The upper surface of the flange 58 has an annular upstanding ridge 62 which bears against the inner surface 64 of an axial recess 66 formed in the gland packing cap 68 which is threaded at 70 onto the upper rim of the packing gland base member 16, thus forming a tight seal by compressing the rim 48 of the sealing washer.

The reduced upper portion 72 of the shaft bearing member 56 extends upwards through an axial bore 74 in the cap member 68. The shaft bearing member 56 is prevented from turning and is thus locked on shaft 4 by means of nut 76 which in turn is held against turning by lock nut 78. It will be understood that there is practically no pressure between the underside of the nut 76 and the upper rim 80 of the cap 68, the pressure being from ridge 62 onto the inner surface of the recess 64 in the cap 68. In this manner the shaft and the members 56, 76 and 78 secured thereon can rotate freely, the spring plate 40 pressing the sealing washer 44 against the ridge 60 to form a tight seal. The ridge 62 is preferably polished to provide a perfect seal, leakage of fluid being thus effectively prevented by the various seals as described.

Although I have described a preferred embodiment of my invention by reference to a hydraulic door closing mechanism, it is to be understood that this is merely by way of example, and that it may be employed in any installation where it is desired to effect a liquid or fluid tight seal between a rotatable shaft and a bearing housing, and it will be further understood that various changes may be made in size, shape, material and arrangement without departing from the spirit and scope of the invention as claimed.

I claim:

1. A fluid seal comprising a shaft rotatable in a housing having a bore, a flanged member carried by said shaft and rotatable with the shaft in said bore, said bore being enlarged to form a shoulder, said flanged member having on its flange an upstanding first annular ridge bearing against said shoulder to form a tight seal, said flange having on its lower surface a depending second annular ridge, an annular flexible sealing washer having its rim clamped in said housing to form a tight seal between said washer and the housing, said sealing washer having an axial aperture through which said shaft extends and being so arranged that its upper surface bears against said second annular ridge, pressure plate means for pressing an intermediate portion of said sealing washer upwards against said second annular ridge to form a tight seal, a spring disposed in said enlarged bore with its lower end resting on the floor of the bore and with its upper end pressing against said pressure plate biasing it upwards against said sealing washer to maintain a tight seal as said shaft rotates, and means acting against the flanged member and sealing washer for tightly sealing the shaft to the housing.

2. A bearing seal for a rotary shaft of a fluid operated means, comprising a cupped packing gland base sealed to said means with the shaft projected therein, a cap member detachably crowning the base and about the shaft, a flexible washer marginally secured between the base and cap member, a coiled spring helically about the shaft, confined in the packing gland base and seated on the flooring of the latter, a pressure plate between the spring and the washer, a shaft bearing member adjustably connected on the shaft for free rotation in the cap member above the washer, said shaft bearing member having a flange provided with opposed ridges, the ridges being in contact with said cap member and washer, and locking means carried by said shaft and co-acting with said cap member for locking the bearing member on said shaft.

JOHN M. WISNIEWSKI.

REFERENCES CITED

The following references are of record in the file of this patent:

UNITED STATES PATENTS

| Number | Name | Date |
| --- | --- | --- |
| 1,649,314 | Marden | Nov. 15, 1927 |
| 1,789,497 | Potter | Jan. 20, 1931 |
| 2,223,070 | Lkeckner | Nov. 26, 1940 |

FOREIGN PATENTS

| Number | Country | Date |
| --- | --- | --- |
| 500,425 | Germany | 1930 |